(12) United States Patent
Goldner

(10) Patent No.: US 10,868,434 B2
(45) Date of Patent: Dec. 15, 2020

(54) LUGGAGE WITH INTEGRATED WIRELESS CHARGER FOR ELECTRONIC DEVICES

(71) Applicant: Tri-Athalon, Inc., Roslyn, NY (US)

(72) Inventor: Robert Goldner, Roslyn, NY (US)

(73) Assignee: TRI-ATHALON, INC., Roslyn, NY (US)

( * ) Notice: Subject to any disclaimer, the term of this patent is extended or adjusted under 35 U.S.C. 154(b) by 155 days.

(21) Appl. No.: 16/239,612

(22) Filed: Jan. 4, 2019

(65) Prior Publication Data

US 2019/0214839 A1 Jul. 11, 2019

Related U.S. Application Data

(60) Provisional application No. 62/613,825, filed on Jan. 5, 2018.

(51) Int. Cl.
*H02J 7/00* (2006.01)
*H02J 7/02* (2016.01)
*H02J 50/10* (2016.01)
*A45C 15/00* (2006.01)
*A45C 5/14* (2006.01)

(52) U.S. Cl.
CPC ............... *H02J 7/025* (2013.01); *A45C 5/14* (2013.01); *A45C 15/00* (2013.01); *H02J 7/0045* (2013.01); *H02J 50/10* (2016.02)

(58) Field of Classification Search
CPC .......... H02J 7/025; H02J 50/10; H02J 7/0045; A45C 5/14; A45C 15/00
See application file for complete search history.

(56) References Cited

U.S. PATENT DOCUMENTS

| 6,438,229 B1 | 8/2002 | Overy et al. |
| 6,870,089 B1 | 3/2005 | Gray |
(Continued)

FOREIGN PATENT DOCUMENTS

| CN | 202341101 U | 7/2012 |
| CN | 104659868 A | 5/2015 |
(Continued)

OTHER PUBLICATIONS

"SkyVale Luggage Coming Soon", YouTube: Video [online], Oct. 2018, https://www.youtube.com/watch?v=Nx61pPTUuY, 3 pages.
(Continued)

*Primary Examiner* — Arun C Williams
(74) *Attorney, Agent, or Firm* — Edell, Shapiro & Finnan, LLC

(57) ABSTRACT

A wireless charger for batteries in mobile phones and other electronic devices is structurally integrated in a luggage item. The wireless charger is in the form of a module secured to and extending through a wall of the luggage item and includes a frame secured to the luggage item wall. A charger panel having a charger surface is rotatably mounted in the frame to be pivot between closed position and open positions. In the closed position the charger surface is recessed in the frame; in the open position charger surface projects from the luggage unit wall and is exposed to receive and support an electronic device having a battery to be wirelessly charged. A battery pack is mounted in the luggage item and is connected by a cable to supply primary energy to the charger.

19 Claims, 11 Drawing Sheets

(56) References Cited

U.S. PATENT DOCUMENTS

| | | | |
|---|---|---|---|
| 7,422,476 B2 | 9/2008 | Marmaropoulos et al. | |
| 8,593,108 B2 | 11/2013 | Ferber et al. | |
| 8,729,737 B2 | 5/2014 | Schatz et al. | |
| 9,112,363 B2 | 8/2015 | Partovi | |
| 9,144,281 B2 | 9/2015 | Cross | |
| 9,722,439 B2 | 8/2017 | Williams | |
| 10,034,527 B2 * | 7/2018 | Korey | A45C 5/14 |
| 10,103,566 B2 * | 10/2018 | Curescu | A45C 5/14 |
| 10,473,555 B2 * | 11/2019 | Bertness | H01M 10/4285 |
| 10,595,608 B2 * | 3/2020 | Korey | A45C 15/00 |
| 2005/0140331 A1 | 6/2005 | McQuade | |
| 2007/0052388 A1 | 3/2007 | Wilson et al. | |
| 2009/0096413 A1 | 4/2009 | Partovi et al. | |
| 2012/0042996 A1 | 2/2012 | Glynn | |
| 2012/0152677 A1 * | 6/2012 | Lu | A45C 5/14 190/18 A |
| 2013/0106353 A1 * | 5/2013 | Foster | H01M 10/4207 320/114 |
| 2013/0221898 A1 | 8/2013 | Frost | |
| 2013/0248309 A1 | 9/2013 | Lein et al. | |
| 2014/0000771 A1 | 1/2014 | Sherman et al. | |
| 2014/0253030 A1 * | 9/2014 | Moon | H02J 50/40 320/108 |
| 2014/0308995 A1 | 10/2014 | Wu | |
| 2015/0015195 A1 | 1/2015 | Leabman et al. | |
| 2015/0027836 A1 | 1/2015 | Zhou | |
| 2016/0020640 A1 | 1/2016 | Rogers | |
| 2016/0190817 A1 | 6/2016 | Hartelt et al. | |
| 2016/0336789 A1 * | 11/2016 | Hyun | H01F 38/14 |
| 2017/0127781 A1 | 5/2017 | Korey et al. | |
| 2017/0127782 A1 | 5/2017 | Korey et al. | |
| 2017/0127783 A1 | 5/2017 | Korey et al. | |
| 2018/0000213 A1 | 1/2018 | Korey et al. | |
| 2018/0000214 A1 | 1/2018 | Korey et al. | |

FOREIGN PATENT DOCUMENTS

| | | |
|---|---|---|
| CN | 106263398 A | 1/2017 |
| JP | 3200564 U | 10/2015 |

OTHER PUBLICATIONS

PCT International Search Report and the Written Opinion, PCT/US2019/012248, dated Mar. 27, 2019, 8 pages.

* cited by examiner

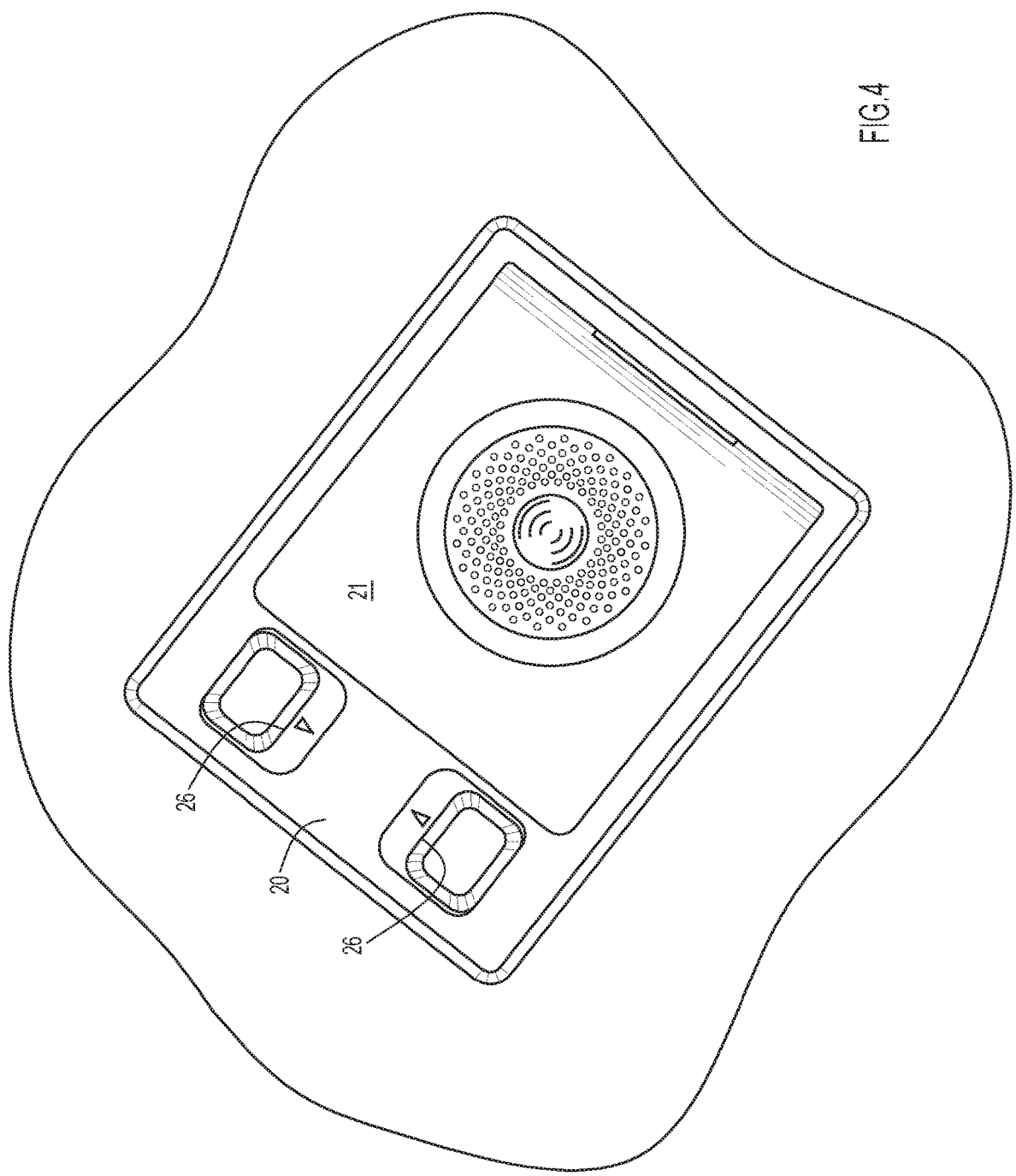

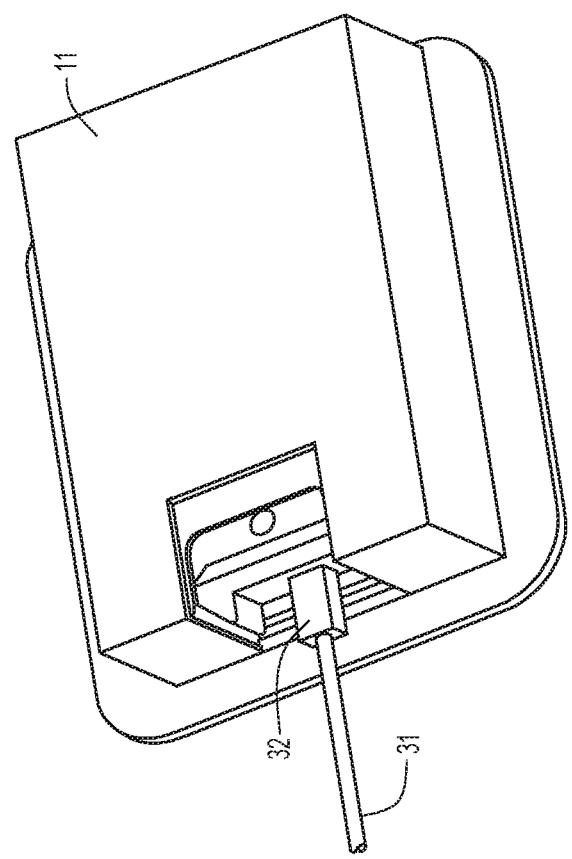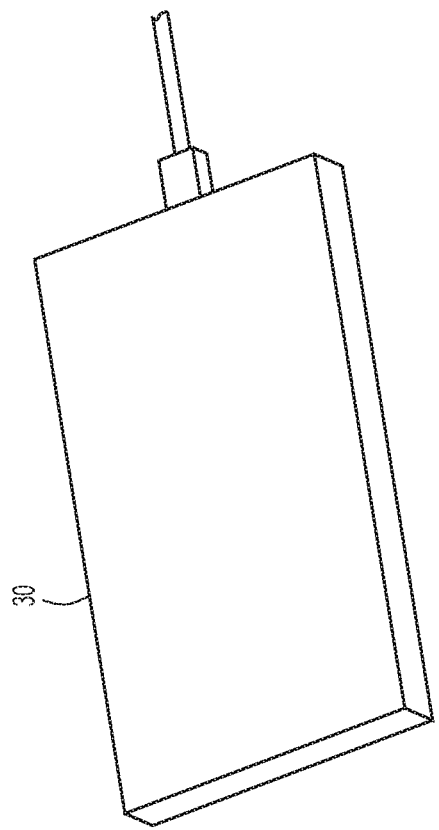
FIG.11

LUGGAGE WITH INTEGRATED WIRELESS CHARGER FOR ELECTRONIC DEVICES

CROSS REFERENCE TO RELATED APPLICATION

This is a non-provisional application based on U.S. Provisional Application No. 62/613,825, entitled "Luggage Having Integrated Wireless Electronic Charger Device", filed Jan. 5, 2018, the disclosure of which is hereby incorporated herein by reference in its entirety.

BACKGROUND

Technical Field

The disclosure herein pertains to luggage items having integrated means for wirelessly charging portable battery-operated electronic devices.

Background of the Invention

Portable battery-operated electronic devices, such as mobile phones, tablet computers, and other hand-held devices have become an essential part of modern daily life. The battery charge duration in many of these devices is less than ideal because of their high rate of battery charge consumption. Accordingly, many people carry separate charging devices when they travel. However, charging devices can be easily misplaced or lost and are inconvenient to carry. Moreover, conventional charging devices require primary power from electrical outlets which are not always readily available or accessible when device charging is needed.

Discussion of the Prior Art

In U.S. Pat. No. 9,722,439 (Williams) there is disclosed a carry bag with a self-contained charger battery and cable that can be connected to charge a cell phone. The charger cable terminates in a plug connector that is secured in place at the bottom of a small external pocket of the carry bag so as to be selectively connected to the charging receptacle of a cell phone placed in the pocket to charge the cell phone battery. This arrangement, in theory, would seem to overcome the above-described problems of having to carry around a separate phone charger and inaccessible electrical outlets. However, the location of the plug connector at the bottom of the external pocket, makes it difficult and inconvenient to insert that connector into the phone charging receptacle. Moreover, the charging receptacle is not standardized for all types and models of portable electronic devices that require periodic battery charging.

Thus, it would be desirable to provide the advantages of a battery charger integrated into a luggage piece without the inconvenience of having to connect a cell phone or other device to be charged to a cable jack mounted in the luggage piece.

Terminology

It is to be understood that, unless otherwise stated or contextually evident, as used herein:
The terms "upper", "top", "bottom", "above", "below", "horizontal", etc., are used for convenience to refer to the orientation of a luggage item and its integrated charger module when the luggage item is resting on the ground or other horizontal surface, and are not intended to otherwise limit the structures described and claimed.

OBJECTS AND SUMMARY

Therefore, in light of the above, and for other reasons that become apparent from the following descriptions, it is one object of the present application to provide a wireless charger that is integrated into to a luggage item to permit a traveler to easily charge a cell phone or other portable electronic device at any time and place.

In accordance with one aspect of the present disclosure, a wireless battery charger is structurally integrated into a luggage unit, such as a travel bag, backpack, or the like. The luggage unit is provided with an opening or recess in a wall thereof to which a wireless charger module or assembly is mounted or otherwise structurally secured. The charger module has manually selectable open and closed positions. In the closed position the charger module resides substantially flush with the travel bag rear wall. In the open position a wireless charger panel is pivoted outward about its bottom edge to extend from the charger module and the travel bag wall such that a charging surface of the charger panel is exposed. A cellphone or other device may be placed on and supported by the exposed charging surface and inductively charged by an induction coil, or the like, disposed within the panel. A charger battery pack, preferably rechargeable, is secured interiorly of the travel bag and is electrically connected by a cable to the wireless charger to supply the required charging power. Structures are provided on the wireless charger panel to positively engage opposite sides of cellphone and are movable to securely accommodate a range of cell phone widths. When closed, the panel is engaged in a module recess by spring loaded hooks that are selectively releasable by finger-actuated buttons recessed in the charger module above the panel.

In accordance with another aspect of the disclosure, a method for charging a battery in an electronic device comprises supplying current to a wireless battery charger structurally integrated in a luggage unit from a voltage supply mounted within the luggage unit, selectively pivoting a charger plate of the wireless battery charger from a closed position in which a charger surface of the charger is recessed in a wall of the luggage unit to an open position in which the charger surface is exposed, and placing the electronic device on the charger surface to permit inductive charging of the electronic device battery. The electronic device may be positively engaged on the charger surface by selectively moving side walls of the charger plate into engagement with sides of the device.

The above and still further features and advantages of the present disclosure will become apparent upon consideration of the definitions, descriptions and figures of specific embodiments set forth herein. In the detailed description below, like reference numerals in the various figures are utilized to designate like components and elements, and like terms are used to refer to similar or corresponding elements in the several embodiments. While these descriptions go into specific details of the invention, it should be understood that variations may and do exist and would be apparent to those skilled in the art in view of the following description.

BRIEF DESCRIPTION OF THE DRAWINGS

FIG. 4 is a front view in elevation of the charger module of FIG. 1 shown in its closed position.

FIG. 11 is a rear view in perspective of the charger module shown connected by a cable to a battery.

DESCRIPTION OF THE PREFERRED EMBODIMENTS

Figure 1:
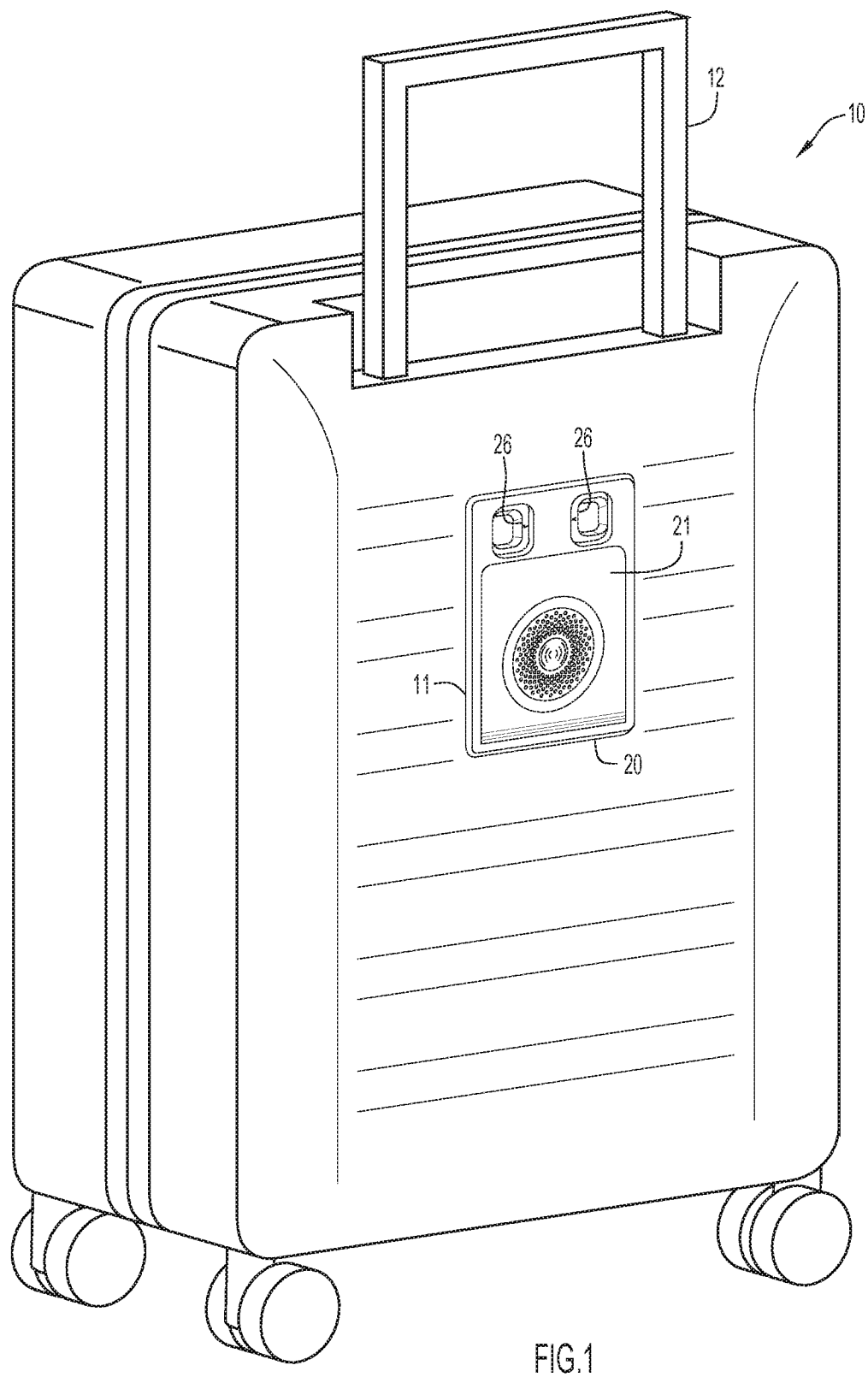
FIG. 1 is a rear view in perspective of a spinner-type bag in which a wireless charger module assembly has been installed in its rear wall and is shown in its closed position.

The preferred embodiment example described and illustrated in this disclosure takes the form of a spinner type luggage item having an integrated wireless charger module for charging the battery of a cell phone or other portable electronic battery-operated device. It is to be understood that the principles described herein apply equally to any other type of bag, luggage item, backpack, duffel bag, tote bag, messenger bag, travel laptop case carrying case, suitcase, garment bag, briefcase, etc.

Referring more specifically to the drawings, a spinner bag 10 has a wireless charger module 11 made of molded plastic parts and disposed in a recess or opening in the rear wall of the bag with the exposed outer surface 21 of the rear panel 20 of the charger module substantially flush with the rear wall of the bag. Charger module 11 is preferably located just below the egress location of the legs of a conventional retractable luggage handle assembly 12. The frame and rear panel of the charger assembly may be substantially rectangular, as shown, or circular, polygonal, or any other shape that is consistent with the operating principles described herein.

Panel 20 of charger module 11 is pivotable about its bottom edge between a closed position (shown in FIG. 1), in which it is received in a rectangular tray or recess 22 of the module, and an open position (shown in FIG. 2) in which it extends outward, preferably perpendicularly, from tray 22 and the rear wall of bag 10. It is to be understood that the perpendicular orientation for the open position is provided in the disclosed embodiment; however, the open orientation may be at an acute angle in other embodiments. The pivot axis is preferably defined by a conventional spring hinge (not shown) that positionally biases the panel toward its open position. An outer engagement section or side wall 23 of panel 20 is disposed at the distal edge of the panel (the upper edge in the closed position) and is provided with two engagement apertures 24 defined therethrough in the plane of the panel. Apertures 24 are configured and located to be engaged, in the closed panel position, by respective hook members 25 (best seen in FIG. 2) projecting downward into tray 22 from the top wall thereof. Hook members 25 are structurally connected to and movable horizontally with respective spring loaded actuators 26 recessed into the charger module just above tray 22. When actuators 26 are manually squeezed together between a user's thumb and forefinger, the hooks 25 are moved out of engagement with respective apertures 24, permitting the panel 20 to feely pivot about its bottom edge to its open position.

Figure 12:
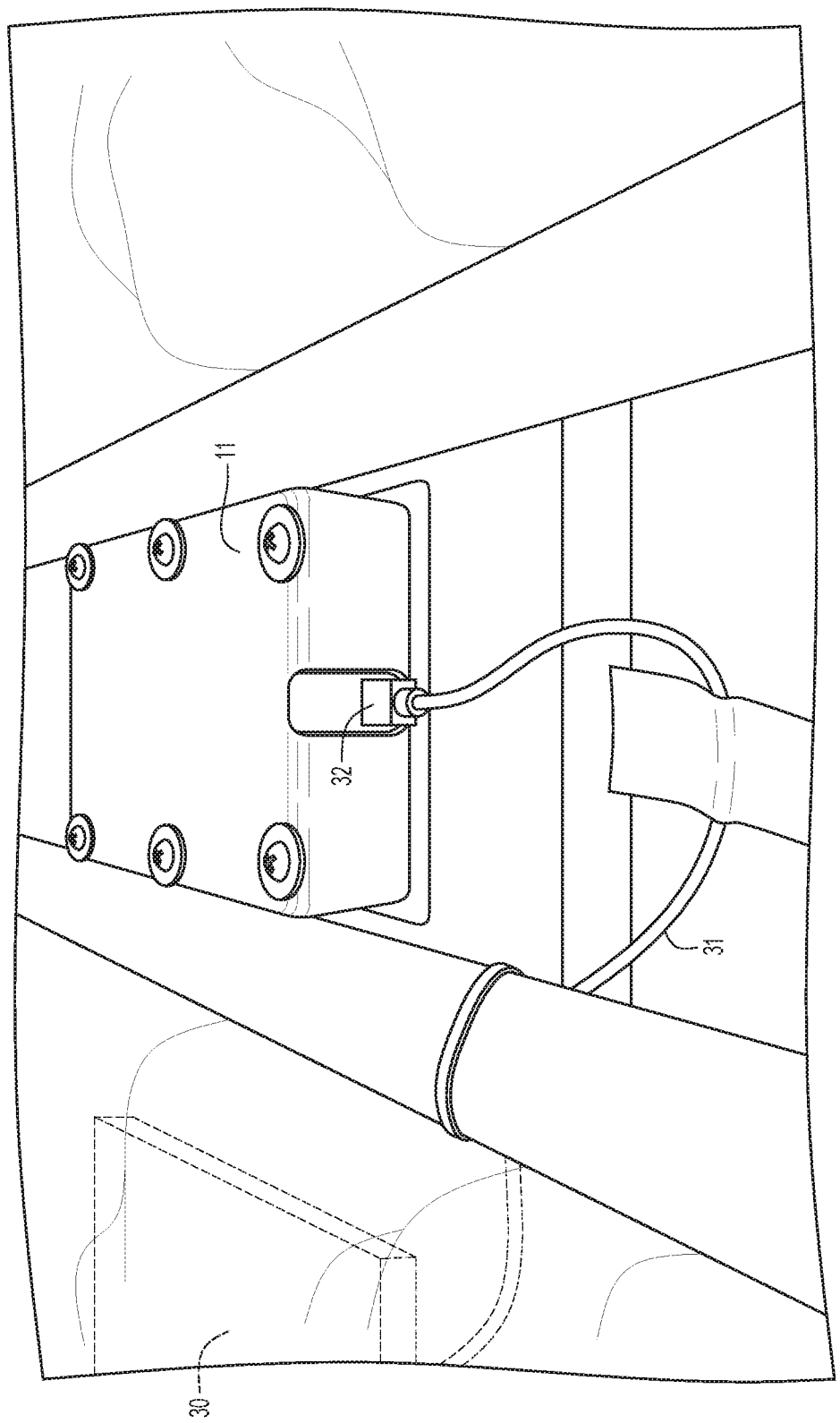
FIG. 12 is a rear view in perspective of the charger module shown mounted internally in the spinner luggage unit of FIG. 1.

Panel 20 is an inductive charger (also known as a wireless charger) which may function in the manner of any known inductive charger such as, by way of example only, the wireless chargers described and illustrated in US20140308995 (Wu) and US20090096413) Partovi et al, the disclosures in which are incorporated herein in their entireties. Further examples may be substantially any wireless charger employing either the Qi or PMA wireless charging standard. In this regard, an induction coil (not shown) is embedded in panel 20 and is electrically connected to a charger battery pack 30 (FIG. 11) via a cable 31 and USB jack 32, or the like, that is received in a USB receptacle, or the like, at the base of charger module 11. FIG. 11 shows the rear of the charger module as would be seen from inside bag 10. As illustrated in FIG. 12, the charger battery pack 30 is mounted or otherwise secured inside the bag 10 at a location from which it can be selectively removed to be recharged as necessary. Alternatively, charger battery pack 30 may be replaceable rather than rechargeable.

Figure 2:
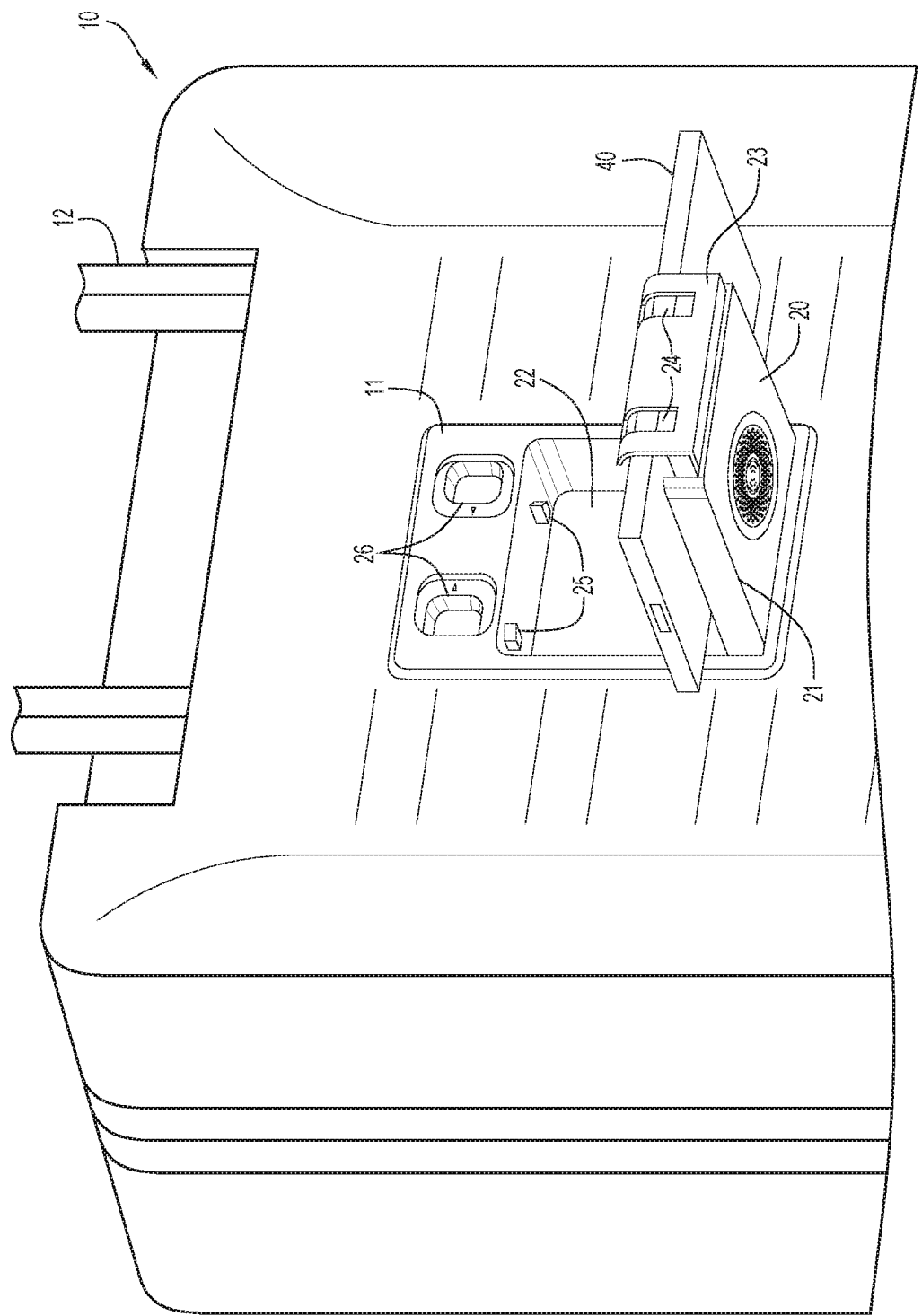
FIG. 2 is a detailed rear view in perspective from below of a portion of the spinner bag of FIG. 1 wherein the charger module is shown in the open position with a cell phone to be charged positioned thereon.
Figure 3:
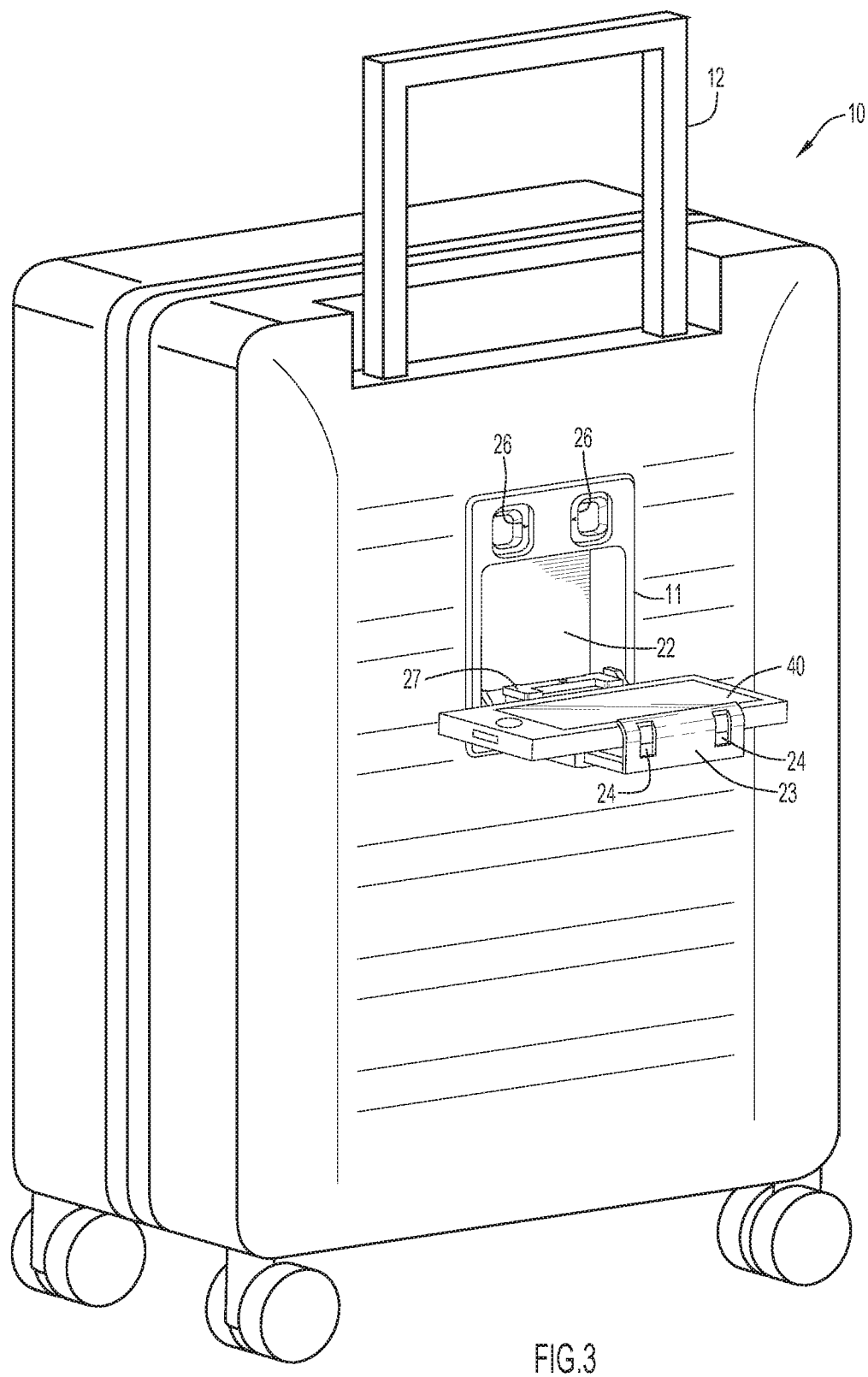
FIG. 3 is a rear view in perspective from above of the spinner bag of FIG. 1 wherein the charger module is shown in the open position with the cell phone to be charged positioned thereon.
Figure 6:
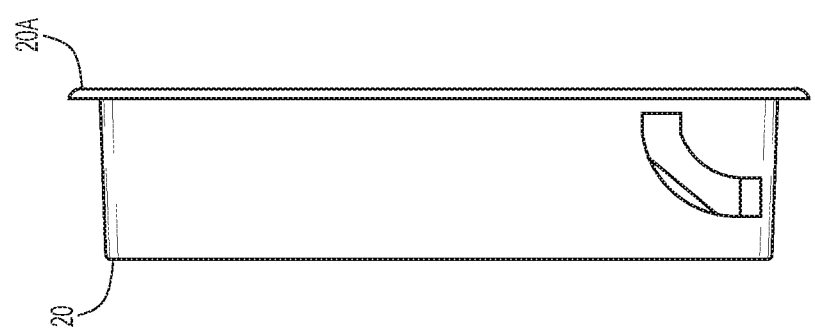
FIG. 6 is a side view in elevation of the charger module shown in its closed position.
Figure 5:
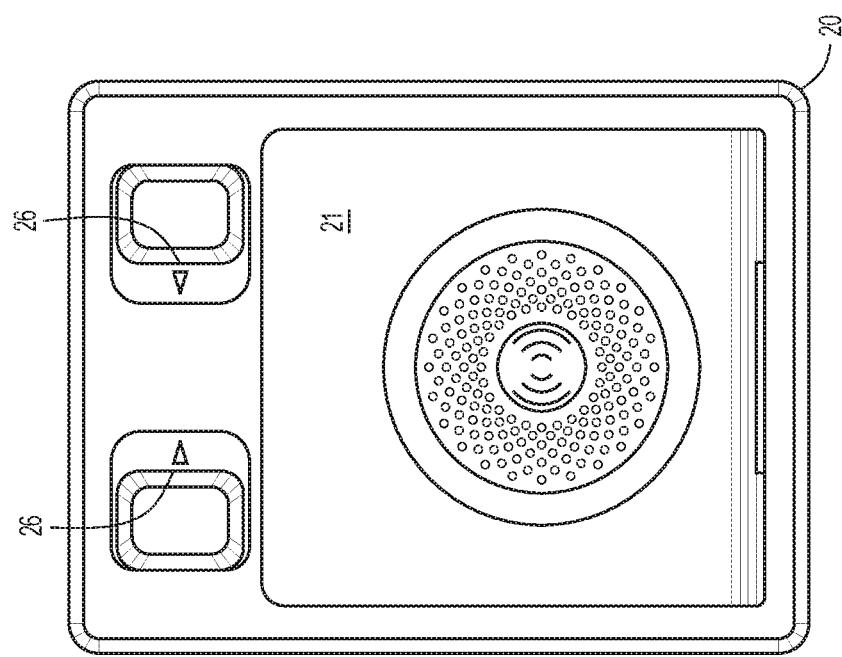
FIG. 5 is a front view in perspective of the charger module shown in its closed position.
Figure 7:
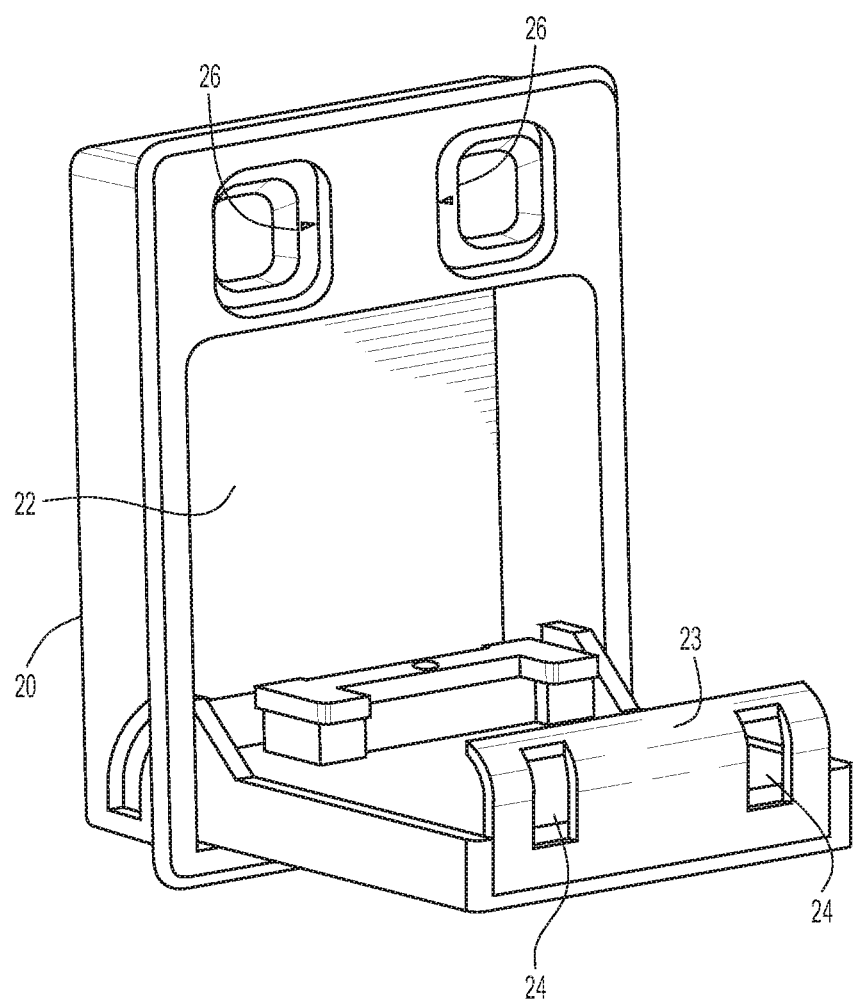
FIG. 7 is a view in perspective of the charger module shown in its open position.
Figure 8:
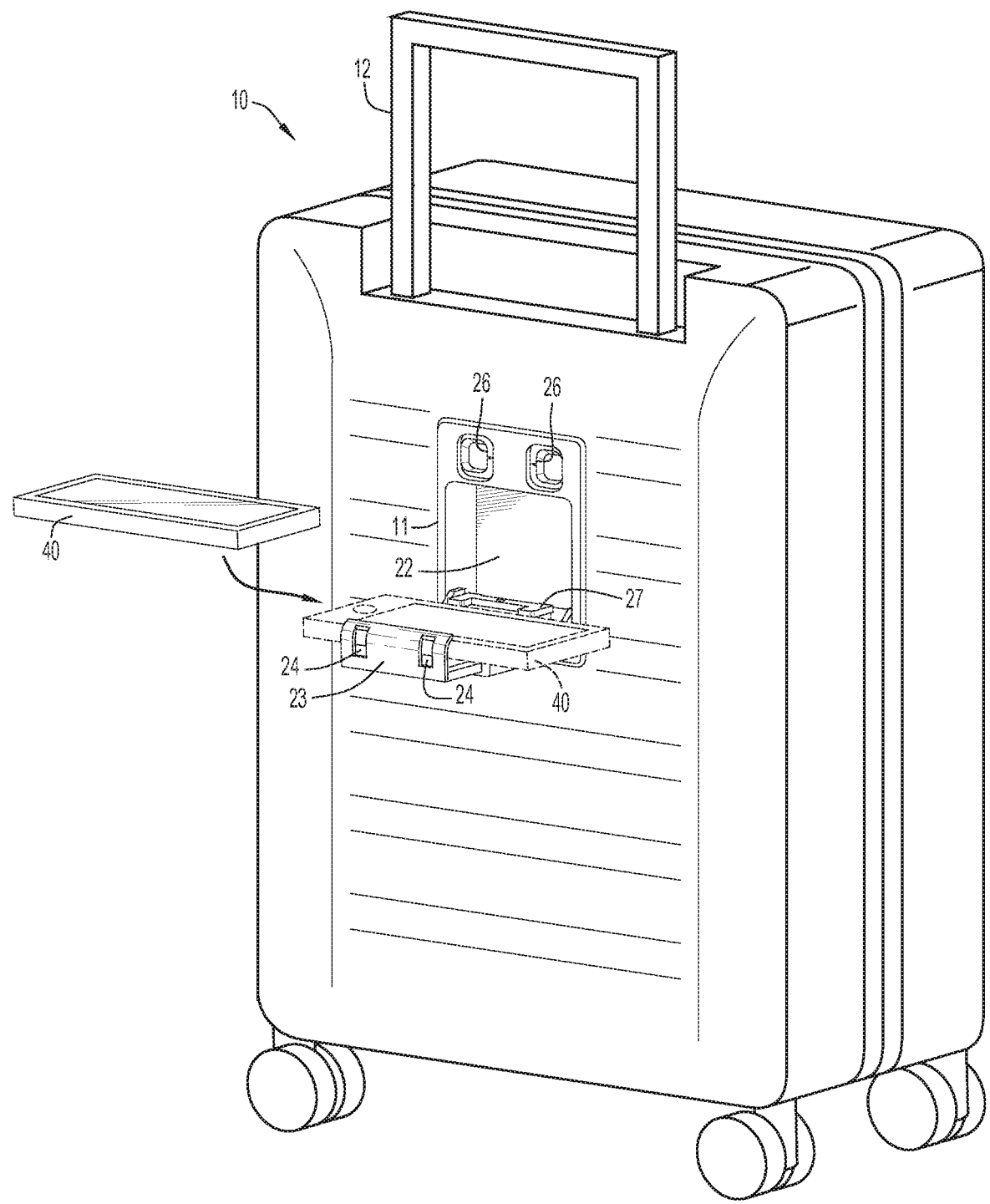
FIG. 8 is a rear view in perspective of the back wall of the spinner bag of FIG. 1 showing the charger module in its open position and diagrammatically illustrating insertion of a cellphone onto the charger plate.
Figure 9:
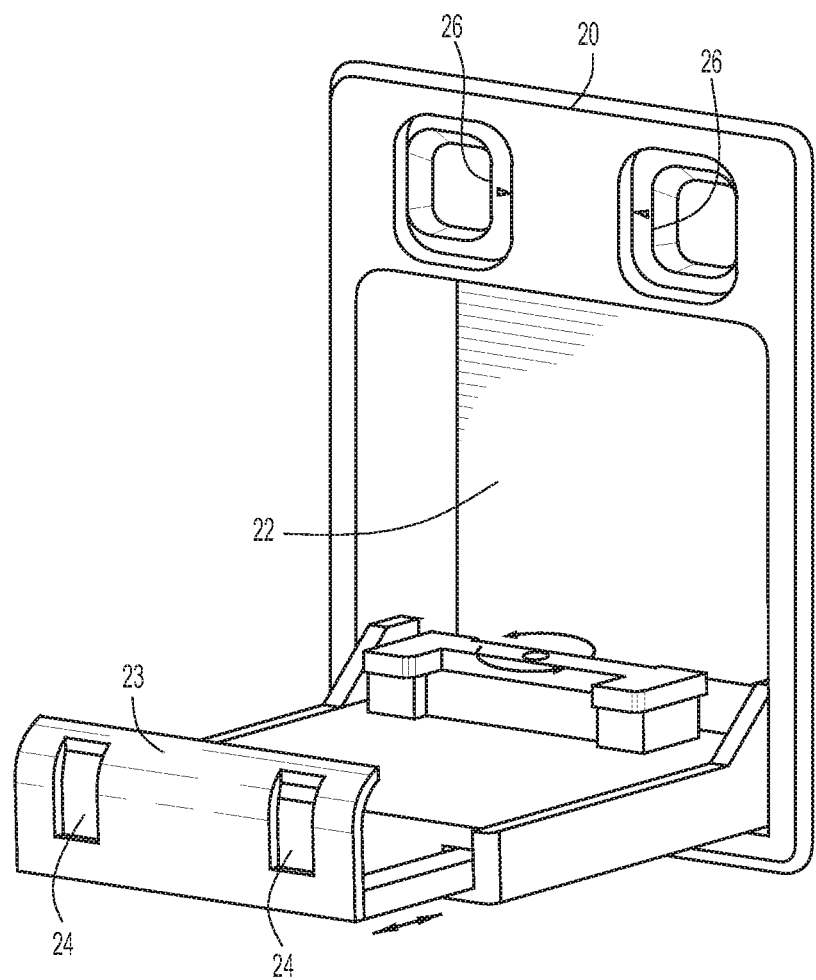
FIG. 9 is a perspective view of the open charger module diagrammatically illustrating its adaptability to different size cell phones and other electronic devices to be charged.
Figure 10:
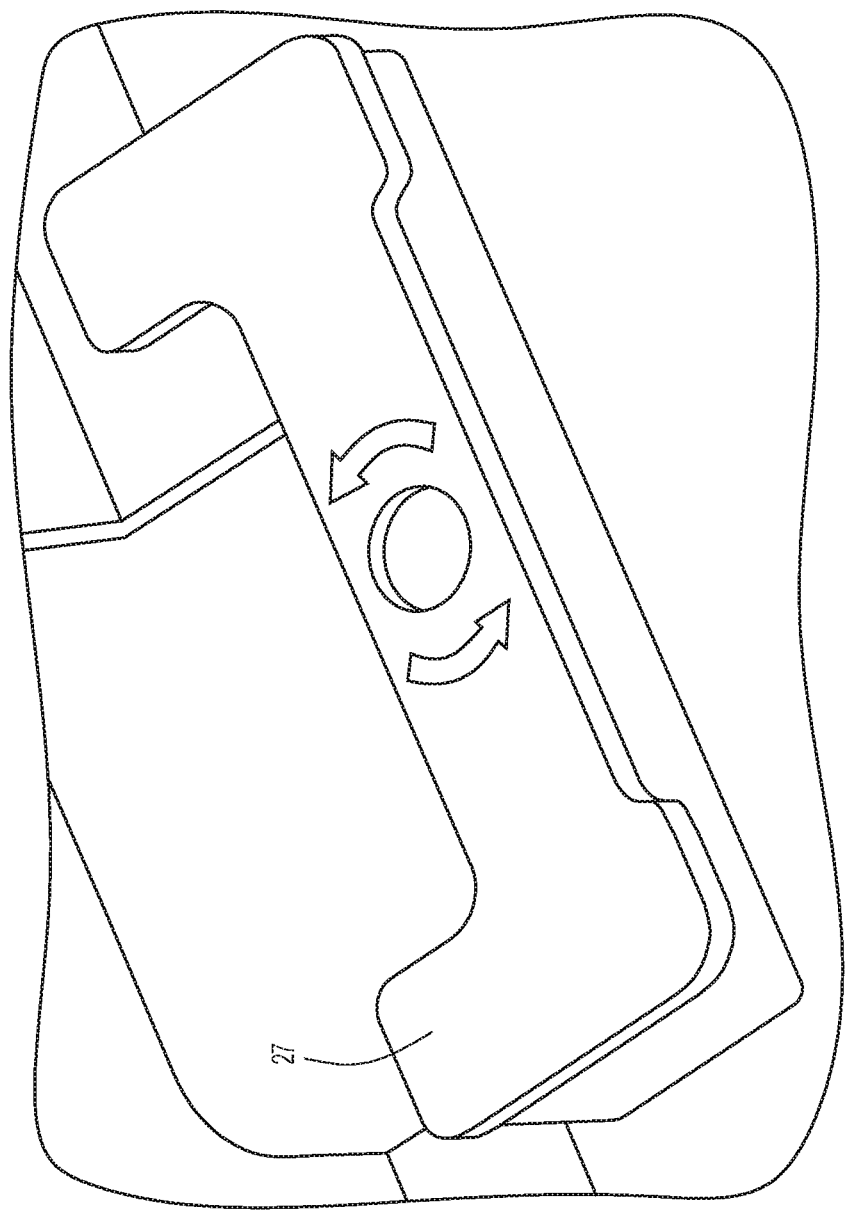
FIG. 10 is a detail view in perspective of a rotatably adjustable engagement lock member of the charger module.

A cellphone 40 may be placed on the upward facing charging surface of open panel 20 so as to be inductively charged. The cellphone is positively positionally engaged when on the charging surface between an outwardly slidable distal side wall or engagement section 23 at the charging surface outer edge, and a proximal rotatable engagement lock 27 disposed at the opposite surface edge. Specifically, as best illustrated in FIGS. 2, 8 and 9, outer engagement side wall 23 is slidable away from and back toward the outer panel edge to expand and contract the width of the space for receiving cellphone 40 on the charging surface of the panel. Side wall 23 may be resiliently biased proximally, by a spring or the like, toward engagement lock 27. Engagement Lock 27 is rotatable in a plane parallel to the charging surface to engage the opposite edge of cellphone 40. Engagement lock 27 is configured in the shape of an asymmetric dog bone where the medial portion is thinner than the end portions, and the end portions along one side project transversely farther than on the other side. Lock 27 has two 180°-spaced operative rotational positions wherein it is parallel to edge section 23. In one rotational position the larger end portions of the lock extend farther toward edge 23 than do the smaller end portions in the other rotational position. As a result, depending on the rotational position of lock 27, the space between engagement lock 27 and edge 23 can accommodate cell phones of different widths. When panel 20 is closed, or is to be rotated closed, engagement lock 27 is placed in the rotational position wherein its large end portions face edge 23 to prevent engagement lock 27 from interfering with panel closure.

When cellphone 40 is placed on the charging surface the induction coil embedded in panel 20, energized by current from battery pack 30, creates an alternating electromagnetic field which a receiver coil in the phone 40 converts into electric current that charges the cellphone battery in a well-known manner.

Exemplary dimensions for one embodiment of the charging module 11 are as follows: module height—135 mm; module width—103 mm; module depth—31 mm; length of panel 20—90 mm; width of panel 20—85 mm. It is to be understood that these dimensions are provided only for purposes of perspective and are not to be considered limitations on the scope of the invention.

Although the descriptions herein and the accompanying figures pertain specifically to use of the charger module in connection with a spinner bag, it is to be understood that the principles of the invention apply to any type of luggage item, backpack, duffel bag, tote bag, messenger bag, travel laptop case carrying case, suitcase, garment bag, briefcase, etc.

The invention broadly contemplates any means for selectively recessing and deploying a wireless (i.e., inductive) charger that is integrated into a luggage item, and the particular embodiment shown and described herein is to be considered merely one example of such means.

Having described preferred embodiments of new and improved luggage unit with an integrated wireless charger for electronic devices, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A combination comprising:
a luggage item;
a wireless charger for portable electronic devices, wherein said wireless charger is structurally integrated in said luggage item;
wherein the wireless charger is in the form of a module secured to and extending through a wall of the luggage item, said module comprising;
a frame secured to said luggage item wall;
a charger panel having a charger surface and rotatably mounted in said frame to be rotatable between a closed position and an open position;
wherein in said closed position said charger surface is recessed within said frame, and in said open position said charger surface projects from the luggage unit wall and is exposed to receive and support an electronic device having a battery to be charged.

2. The wireless charger of claim 1 further including first and second oppositely spaced side walls extending up from respective opposite first and second edges of said charger surface and configured to positively engage respective sides of said electronic device.

3. The combination of claim 2 wherein said first side wall is movable to adjust the space between said first and second side walls along said charger surface.

4. The combination of claim 3 wherein in said open position said first charger surface edge is located outward from said frame, and wherein said first side wall is selectively movable proximally and distally relative to said second side wall.

5. The combination of claim 4 wherein said first side wall is spring biased toward said second side wall.

6. The combination of claim 5 wherein said second side wall is movable to adjust the space between said first and second side walls along said charger surface.

7. The combination of claim 6 wherein said second side wall is a rotatable member having first and second 180°-spaced rotation positions, said rotatable member in said first rotation position extending closer to said first side wall than in said second rotation position.

8. The combination of claim 2 wherein said second side wall is movable to adjust the space between said first and second side walls along said charger surface.

9. The combination of claim 8 wherein said second side wall is a rotatable member having first and second 180°-spaced rotation positions in a plane parallel to said charger surface, said rotatable member in said first rotation position extending closer to said first side wall than in said second rotation position.

10. The combination of claim 9 wherein said rotatable member has an asymmetric substantially dog bone configuration with a medial portion and transversely projecting end portions, the end portions on one side projecting transversely farther than on the other side.

11. The combination of claim 6 further including a battery pack housed in an interior pocket of the luggage item for providing power to the charger.

12. The combination of claim 6, said charger module further comprising a manually actuable locking member structurally connected to and movable with respective spring loaded actuators recessed into the charger module above the charger panel in the closed position in a configuration such that the locking member engages the charger panel in the closed position and when manually actuated releases the charger panel permitting it to pivot about its bottom edge to the open position.

13. The combination of claim 2 further including a battery pack housed in an interior pocket of the luggage item for providing power to the charger.

14. The combination of claim 2, said charger module further comprising a manually actuable locking member structurally connected to and movable with respective spring loaded actuators recessed into the charger module above the charger panel in the closed position in a configuration such that the locking member engages the charger panel in the closed position and when manually actuated releases the charger panel permitting it to pivot about its bottom edge to the open position.

15. A method for charging a battery in an electronic device comprising:
supplying current to a wireless battery charger structurally integrated in a luggage unit from a voltage supply mounted within the luggage unit;
pivoting a charger plate of the wireless battery charger from a closed position in which a charger surface of the charger is recessed in a wall of the luggage unit to an open position in which the charger surface is exposed; and
placing the electronic device on the charger surface to permit inductive charging of the electronic device battery.

16. The method of claim 15 further comprising positively engaging the electronic device placed on the charger surface by moving side walls of the charger plate into engagement with sides of the electronic device.

17. The method of claim 16 wherein positively engaging the electronic device comprises spring-biasing said side walls toward one another.

18. The method of claim 15 wherein in said open position the charger surface is substantially perpendicular to said wall of the luggage unit.

19. The method of claim 15 wherein in said open position the charger surface is at an acute angle to said wall of the luggage unit.

* * * * *